United States Patent [19]

Duff

[11] Patent Number: 5,111,690

[45] Date of Patent: May 12, 1992

[54] VALVE STEM LOAD MONITORING SYSTEM WITH MEANS FOR MONITORING CHANGES IN THE VALVE YOKE ELONGATION

[75] Inventor: Winslow K. Duff, Export, Pa.

[73] Assignee: Westinghouse Electric Corp., Pittsburgh, Pa.

[21] Appl. No.: 550,175

[22] Filed: Jul. 9, 1990

[51] Int. Cl.⁵ .......................................... G01M 19/00
[52] U.S. Cl. .................................. 73/168; 73/862.32; 73/862.63
[58] Field of Search ............... 73/168, 862.19, 862.27, 73/862.32, 862.39, 862.62, 862.63; 33/788, 787, 790, 791

[56] References Cited

U.S. PATENT DOCUMENTS

| | | | |
|---|---|---|---|
| 3,354,716 | 11/1967 | Wiebe et al. | 73/168 X |
| 4,275,599 | 6/1981 | Kohlenberger et al. | 33/787 |
| 4,428,223 | 1/1984 | Trevisan | 73/168 X |
| 4,505,158 | 3/1985 | Maples | 73/862.63 X |
| 4,542,649 | 9/1985 | Charbonneau et al. | 73/168 |
| 4,805,451 | 2/1989 | Leon | 73/168 |
| 4,841,226 | 6/1989 | Meline et al. | 33/788 X |
| 4,856,327 | 8/1989 | Branam et al. | 73/168 |
| 4,869,102 | 9/1989 | Hale et al. | 73/168 |
| 4,911,004 | 3/1990 | Leon | 73/168 |
| 4,930,228 | 6/1990 | Anderson et al. | 33/788 |
| 4,936,150 | 6/1990 | Burke et al. | 33/788 |

FOREIGN PATENT DOCUMENTS

| | | | |
|---|---|---|---|
| 264148 | 4/1988 | European Pat. Off. | 73/168 |
| 97543 | 5/1986 | Japan | 73/862.63 |
| 107933 | 4/1990 | Japan | 73/862.32 |

Primary Examiner—Thomas B. Will
Assistant Examiner—G. Bradley Bennett

[57] ABSTRACT

A valve stem load monitoring system for determining the axial load on a valve stem of a valve assembly which includes distance measuring means for measuring elongation changes over a substantial portion of the entire length of the yoke whereby signals representative of the sensed elongation changes are generated, with the sensed elongation changes being proportional to the axial load on the valve stem. The distance measuring means is mounted on a portion of the valve assembly other than the yoke. Computation means may be connected to the distance measuring means for receiving the signal therefrom to determine the axial load on the valve stem based on elongation changes in the yoke. Temperature measuring means may be provided on the yoke for generating signals indicative of the temperature of the yoke which are transmitted to the computation means which compensates for any temperature changes in the yoke in determining the axial load on the valve stem.

12 Claims, 2 Drawing Sheets

VALVE STEM LOAD MONITORING SYSTEM WITH MEANS FOR MONITORING CHANGES IN THE VALVE YOKE ELONGATION

BACKGROUND OF THE INVENTION

1. Field of the Invention

The present invention relates to a system for monitoring the axial load on a valve stem of a valve assembly and, more particularly, to such a system which monitors the axial load on a valve stem by monitoring the changes in elongation of the valve yoke during operation of the valve assembly.

2. Description of the Related Art

In many industries, it is important to measure the variable dynamic axial loads imposed on a work piece such as a valve stem. This is particularly true in the nuclear power industry where motor operator valves (MOV's) are extensively used. It is important that these valves are set and maintained correctly at all times since correct operation is critical to health and safety as well as to proper operation of the system in which the MOV's are used. MOV's typically include a valve, a motor operator attached to the valve through a stem and yoke means extending partially around the valve stem for connecting the operator housing and the valve housing.

The best measurement for accurately monitoring the dynamic events within an MOV is by the direct measurement of the valve stem load. It is possible to determine valve stem load from measuring axial (longitudinal) strain. The relationship between the amount of axial elongation of a material (amount of stretch/compression of a material) to the amount of load on a material is known. Therefore by measuring the axial elongation of a valve yoke, valve stem load can be determined.

It is possible to indirectly monitor the dynamic valve stem loads by measuring the strain in the valve yoke. Since valve stem load forces cause equal and opposite yoke reaction forces, the resulting yoke strain is an accurate indicator of the valve stem load.

One current device for determining the axial load on a valve stem through measurement of the strain in the valve yoke is shown in Leon U.S. Pat. No. 4,805,451 which includes a yoke strain sensor mounted directly on the yoke. As described in that patent, the yoke strain sensor is initially calibrated for the particular motor operator/valve configuration by temporarily mounting sensor means directly to the valve stem and applying a load on the valve stem and establishing the relationship between the stem strains measured directly by the valve stem sensor and the forces measured by the yoke strain sensor.

Prior art devices for determining the load on a valve stem through measurement of the valve yoke strain wherein the strain sensor is mounted directly on the yoke, such as that shown in the above described Leon patent, suffer certain disadvantages. For example, the yoke is subject to stress concentration problems in the body thereof and a sensor device mounted directly on the yoke is subject to such localized stress concentrations and therefore may not accurately measure the overall strain in the yoke. The yoke mounted sensor is also subject to local bending and/or torsional effects on the yoke, thus contributing to further inaccuracies in ultimately determining the load on the valve stem. Devices such as that shown in the Leon patent also do not compensate for temperature changes in the yoke which also can result in inaccuracies.

Accordingly, there is still a need for an improved device for accurately and continuously monitoring and measuring the axial load in a valve stem by monitoring the strain in the valve yoke. There is a further need for such a device which also can compensate for temperature changes in the yoke as measurements are being made.

SUMMARY OF THE INVENTION

It is an object of the present invention to provide a system for measuring the load on a valve stem by monitoring the forces in the valve yoke.

It is another object of the present invention to provide a system for determining the load in a valve stem by monitoring changes in elongation of the valve yoke over a substantial portion of its entire length.

It is yet another object of the present invention to provide such a system which is capable of compensating for temperature changes in the valve yoke.

The present invention achieves the above and other objects by providing a valve stem load monitoring system for determining the axial load on a valve stem of a valve assembly having a valve stem and a valve yoke wherein the system includes distance measuring means for measuring elongation changes, i.e., changes in the length of the yoke, over a substantial portion of the entire length of the yoke. The distance measuring means generates signals representative of the sensed elongation changes over a substantial portion of the entire length of the yoke, with the sensed elongation changes being proportional to the axial load on the valve stem. The system further may include computation means connected to the distance measuring means for receiving positional signals therefrom in determining the axial load on the valve stem. Temperature measuring means also may be provided on the yoke for generating signals indicative of the temperature thereof which are transmitted to the computation means which compensates for any temperature changes in the yoke in determining the axial load on the valve stem.

In one embodiment first support means are provided for supporting a target at a position beyond one end of the yoke and second support means are provided for supporting the distance measuring means at a position beyond an opposite end of the yoke whereby the distance measuring means generates signals based on the position of the target representative of sensed elongation changes over the entire length of the yoke. The target may be a reflective spherical target.

In another embodiment of the invention the first support means includes a mounting member having an elongated member extending therefrom for supporting the target in relatively close proximity to the distance measuring means.

In another embodiment of the invention first support means are positioned beyond one end of the yoke and second support means are positioned beyond an opposite end of the yoke whereby the distance measuring device is mounted at one end to one of the support means and is mounted at its other end to the other of the support means.

These, together with other objects and advantages, which will be subsequently apparent, reside in the details of construction and operation as more fully hereinafter described and claimed, reference being made to the accompanying drawings forming a part hereof, wherein like numerals refer to like parts throughout.

DESCRIPTION OF THE PREFERRED EMBODIMENTS

Figure 1:
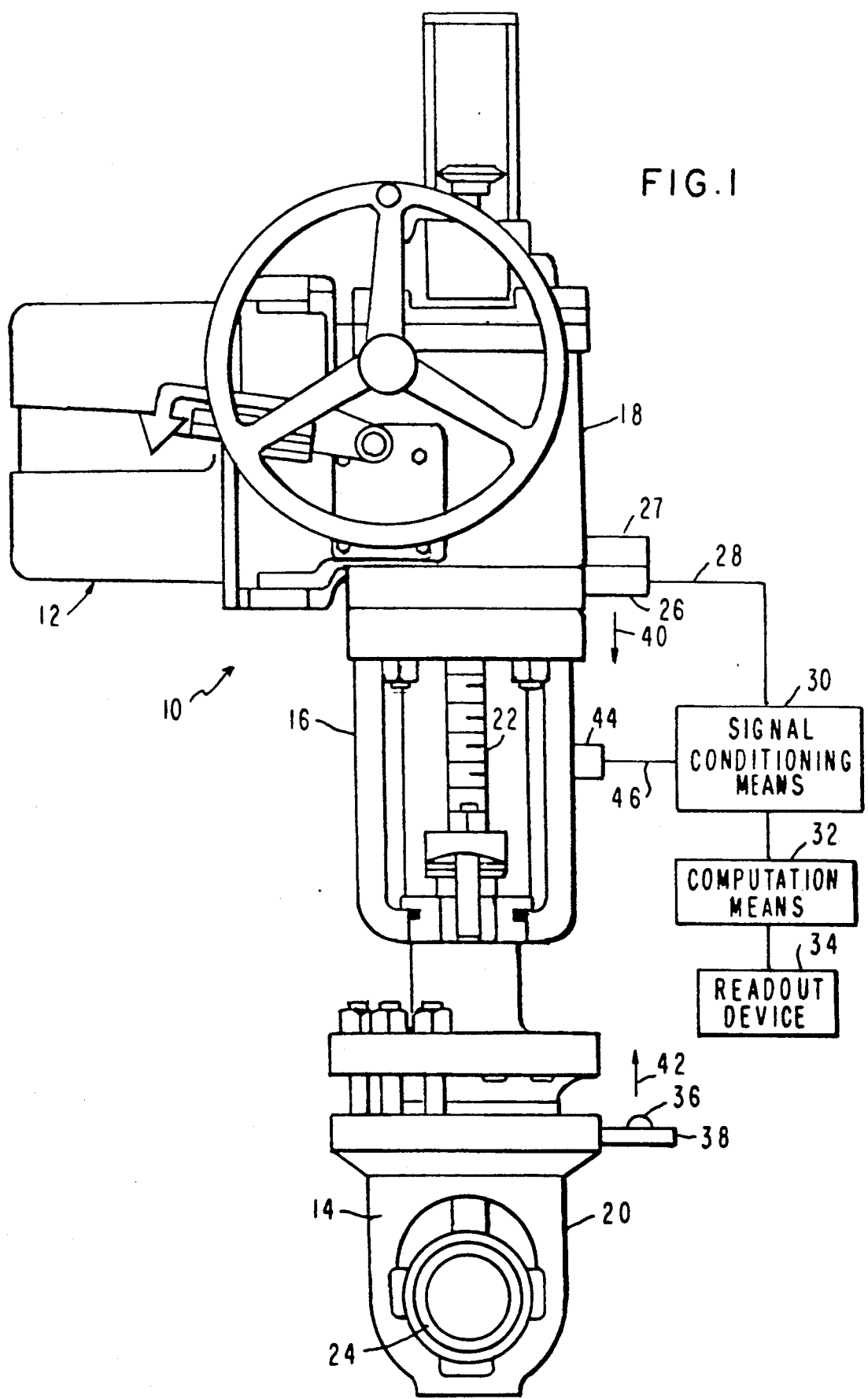
FIG. 1 is an elevational view of a motor operated valve provided with a distance measuring device according to the present invention for measuring elongation changes throughout a substantial portion of the entire length of the valve yoke and computation means for determining the axial load on the valve stem in accordance with the sensed elongation changes in the yoke.

Referring to the drawings, shown in FIG. 1 is a motor operated valve assembly 10 generally comprised of a motor operator 12 and a valve 14 connected by a yoke 16. The motor operator has a housing 18 and the valve has a housing 20. The yoke extends partially around a valve stem 22 which connects the valve to the motor operator. The valve has a valve gate 24 which is connected to the valve stem so as to be movable between a closed or seated position in which it is engaged with a valve seat and an open or backseated position in which it engages a valve backseat. The valve gate is shown in a closed or seated position in FIG. 1. The motor operated valve 10 is of a type which is generally well known and is readily commercially available.

A distance measuring device 26 is mounted on the operator housing 18 by suitable support means 27 at a position beyond one end of the yoke. The distance measuring device measures elongation changes in the yoke over the entire length or at least a substantial portion thereof during operation of the valve assembly. The distance measuring means 26 generates signals representative of sensed elongation changes which are proportional to the axial load on the valve stem. The signals generated by the distance measuring means are transmitted via suitable means such as cable 28 to a signal conditioning means 30 from where they are sent to computation means 32. The computation means may be programmed to determine axial load of the valve stem from the elongation changes in the yoke. A readout device 34 is connected to the computation means to provide an indication of the axial load on the stem during operation of the valve assembly. The indication can be a simple numerical readout or a plot of axial load versus time or axial load versus valve position.

As further shown in FIG. 1, a target 36 is mounted on suitable support means 38 attached to the valve housing 20 at a point beyond the opposite end of the yoke 16. The target 36 is positioned directly below the distance measuring means 26 so that the target 36 interrupts the path of a signal, indicated by the arrow 40, emitted from the distance measuring means whereby the interruption in the signal enables the distance measuring means to accurately measure changes in elongation of the yoke over its entire length thereof.

The target 36 may be a reflective spherical target which reflects the signal from the distance measuring means, as shown by the arrow 42, back to the distance measuring means whereupon a signal is generated which is representative of any changes in the elongation of the entire yoke. The spherical target tends to minimize vibrational effects in the valve assembly to ensure more accurate readings. The distance measuring means may be any suitable device such as a laser device, an ultrasonic device or other position sensor. The elongation changes sensed by the distance measuring means are proportional to the axial load on the valve stem and therefore enable the computation means to readily calculate the load on the valve stem in a known manner.

In the embodiment shown in FIG. 1, means may be provided for compensating for temperature variations in the yoke by attaching a temperature measuring device 44 thereto. Suitable temperature measuring devices include a resistance temperature detector, a thermistor and a thermocouple. The readings from the temperature measuring device are sent by suitable means such as cable 46 to the signal conditioning means 30 and from there are sent to the computation means 32 whereby compensation may be made for any temperature change in the yoke.

Figure 2:
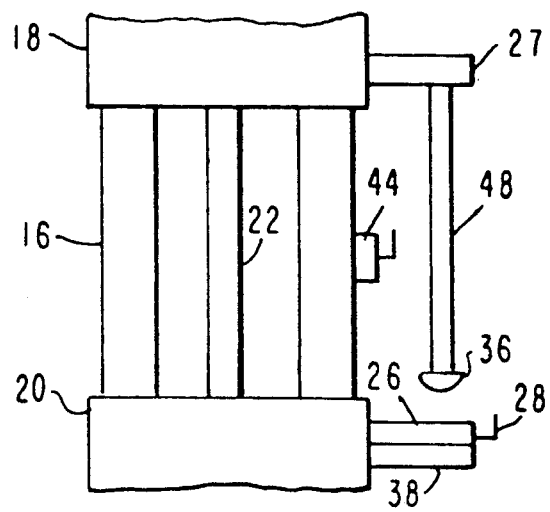
FIG. 2 is a diagrammatic front elevational view of a portion of a motor operated valve assembly showing another embodiment of the invention wherein the target is positioned in close proximity to a distance measuring means.

In the embodiment of the valve stem monitoring system shown in FIG. 2, the target 36 is attached to the end of an elongated member such as rod 48 which extends from support means 27 mounted to the operator housing. In this embodiment, the distance measuring means 26 is mounted to the valve housing by the support means 38. The target 36 therefore is mounted in close proximity to the distance measuring means 26. The target may be a spherical reflective target having approximately the same radius as elongated member 48. By using a spherical target, the gap between the target and the sensor stays the same as the elongated member 48 vibrates or swings so that accurate readings are recorded.

The embodiment of FIG. 2 also may include temperature measuring means 44 on the yoke for generating signals indicative of the temperature of the yoke. Similar to the embodiments shown in FIG. 1, the temperature signals are sent to the signal conditioning means 30 and from there are sent to the computation means 32 whereby compensation may be made for any temperature change in the yoke.

Figure 3:
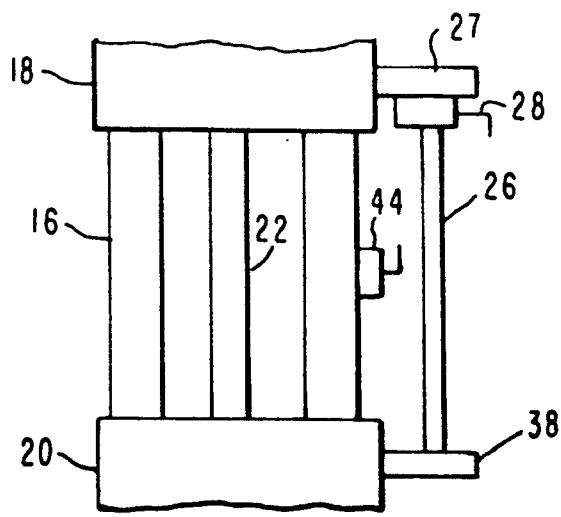
FIG. 3 is a diagrammatic front elevational view of a portion of a motor operated valve assembly showing another embodiment of the invention wherein the distance measuring means is mounted between support means on the operator housing and support means on the valve housing.

In the embodiment shown in FIG. 3, the distance measuring device 26 has one end directly mounted to the support means 27 attached to the operator housing 18 and has its other end mounted to the support means 38 attached to the valve housing 20. The distance measuring device 28 shown in FIG. 3 may be a linear voltage differential transmitter. This embodiment also may include temperature measuring means 44 mounted on the yoke for generating signals indicative of the temperature of the yoke which are sent to the signal conditioning means 26 and from there to the computation means 31 in a manner similar to that described with respect to FIG. 1.

In all of the embodiments, the valve stem load monitoring system measures the elongation or compression in the entire valve yoke or at least a substantial portion thereof throughout operation of the valve assembly. Moreover, since the distance measuring means is not attached directly to the yoke, more accurate readings are obtained since the distance measuring device is not subject to stress concentrations or local bending and/or torsional effects on the yoke.

In operation, the system is initially calibrated to the valve/motor operator couple and this calibration establishes the physical relationship between stem load and yoke elongation and compression. The initial calibration may be accomplished by using a suitable sensing means to initially measure the load of the valve stem. A suitable sensing means may be a diametral sensing member which fits around the valve stem, such as that disclosed in my co-pending application entitled "Diametral Change Sensor for a Cylindrical Member" filed Jul. 9, 1990. After the system has been calibrated, only the distance measuring device needs to be recalibrated during further operation and not the relationship between the valve stem and the yoke. Accordingly, valve maintenance, such as retorquing the fasteners, would have essentially no effect on the physical relationship between the stem and the yoke. This invention actually uses the yoke as a large load cell member. Moreover, the system of the present invention avoids transverse load problems.

Numerous alterations and modifications of the structure herein disclosed will suggest themselves to those skilled in the art. It is to be understood, however, that the present disclosure relates to the preferred embodiments of the invention which are for the purpose of illustration only and is not to be construed as a limitation of the invention. All such modification which do not depart from the spirit of the invention are intended to be included within the scope of the appended claims.

I claim:

1. A valve stem load monitoring system for determining the axial load on a valve stem of a valve assembly having a valve operator, a valve operator housing in which said valve operator is mounted, a valve, a valve housing in which said valve is received for selective movement between opened and closed positions, a valve yoke substantially rigidly interconnecting said valve operator housing and said valve housing, and a valve stem interconnecting said valve and said valve operator, said valve operator being selectively operable for moving the valve between opened and closed positions within said valve housing and thereby imposing an axial load on the valve stem and a parallel axial load, of substantially equal amount and of opposite sense to the valve stem axial load, on the valve yoke and the valve operator housing and the valve housing interconnected thereby, the respective loads on the valve stem and the valve yoke producing corresponding changes, of opposite sense, in the respective parallel axial lengths of the valve stem and the valve yoke, said system comprising:

first and second supports, respectively mounted on said valve assembly at respective, first and second mounting positions and defining respective, first and second reference positions relatively displaced, along a measurement axis parallel to the valve stem axis, by a distance spanning at least a substantial portion of the entire axial length of said yoke; and distance measuring means, having first and second portions respectively affixed to said first and second supports, for directly measuring changes in the distance between the first and second reference positions and as produced by axial loads imposed on the valve stem and generating output signals which are representative of said measured distance changes and thus proportional to the corresponding axial loads imposed on said valve stem.

2. A valve stem load monitoring system as set forth in claim 1, which further includes temperature measuring means on said yoke for generating signals indicative of the temperature of said yoke.

3. A valve stem load monitoring system as set forth in claim 1, which further includes computation means connected to said distance measuring means for receiving said distance change signals therefrom and determining therefrom the axial load on said valve stem.

4. A valve stem load monitoring system as set forth in claim 3, which further includes temperature measuring means mounted on said yoke for generating signals indicative of the temperature of said yoke for generating signals indicative of the temperature of said yoke and means for transmitting said temperature signals to said computation means whereby said computation means compensates for any temperature changes in said yoke in determining the axial load on said valve stem.

5. A valve stem load monitoring system as set forth in claim 1, wherein said valve operator is a motor.

6. A valve stem load monitoring system as set forth in claim 1, wherein:

said first portion of said distance measuring means comprises a target affixed to said first support; and said second portion of said distance measuring means, affixed to said second support, is aligned with said target along said measurement axis and measures changes in the distance therebetween.

7. A valve stem load monitoring system as set forth in claim 1, wherein said target is spherical.

8. A valve stem load monitoring system as set forth in claim 1, wherein said target is reflective.

9. A valve stem load monitoring system as set forth in claim 6, wherein said first support comprises a mounting member affixed to said valve assembly and extending generally transversely of the axis of the valve stem and an elongated member extending from said mounting member along said measurement axis and from said first reference position and toward said second reference position and supporting said target in relatively close proximity to said second portion of said distance measuring means.

10. A valve stem load monitoring system as set forth in claim 1, wherein said distance measuring means is a laser distance measuring device.

11. A valve stem load monitoring system as set forth in claim 1, wherein said distance measuring means is an ultrasonic distance measuring device.

12. A valve stem load monitoring system as set forth in claim 1, wherein said distance measuring device is a linear voltage differential transmitter.

* * * * *